W. W. HENDERSON.
REVERSING GEARING.
APPLICATION FILED SEPT. 6, 1910.
986,631.
Patented Mar. 14, 1911.
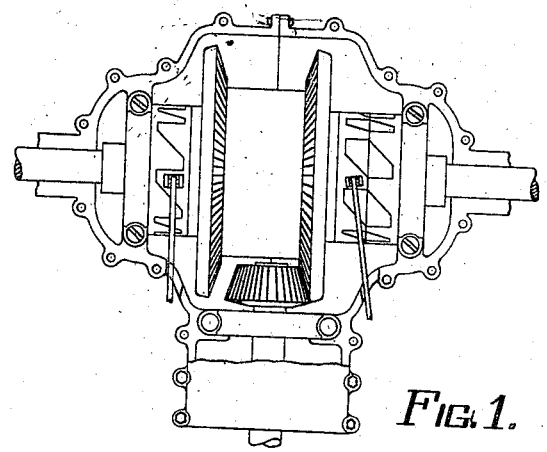
Fig. 1.
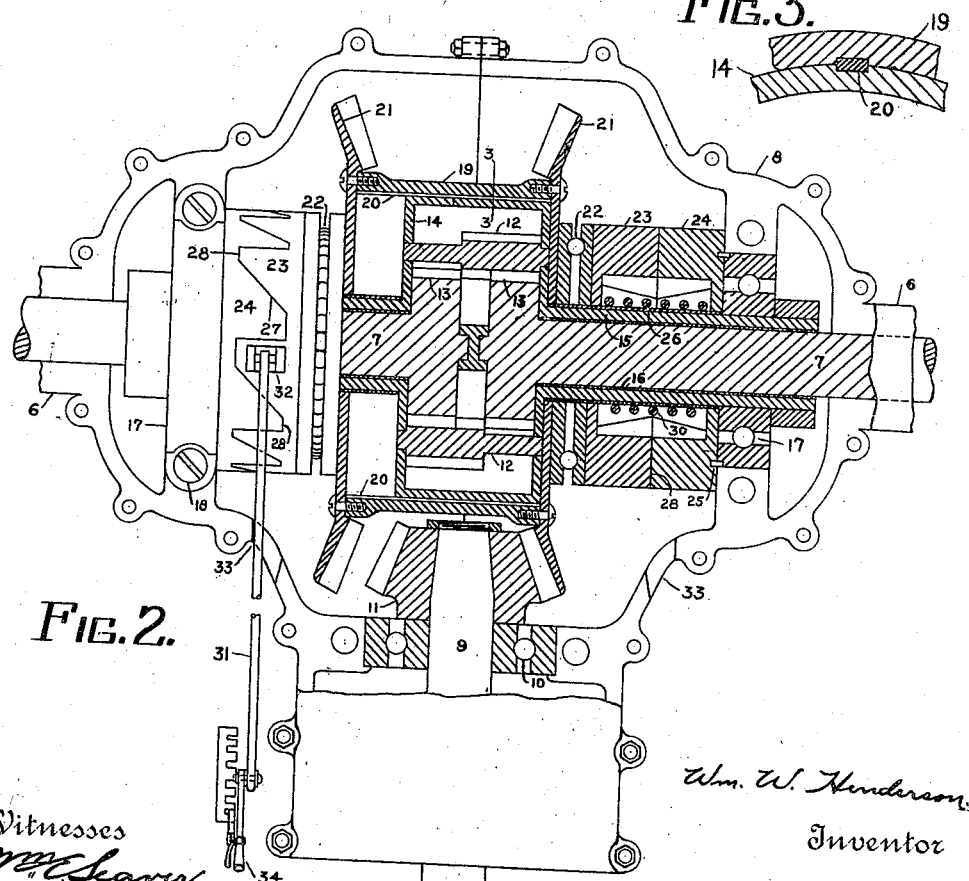
Fig. 2.
Fig. 3.
Witnesses
Wm. W. Henderson
Inventor
Attorney

UNITED STATES PATENT OFFICE.

WILLIAM W. HENDERSON, OF WASHINGTON, DISTRICT OF COLUMBIA, ASSIGNOR TO HYDRAULIC CLUTCH DRIVE CO., OF WASHINGTON, DISTRICT OF COLUMBIA, A CORPORATION OF DELAWARE.

REVERSING-GEARING.

986,631.  Specification of Letters Patent.  Patented Mar. 14, 1911.

Application filed September 6, 1910. Serial No. 580,573.

*To all whom it may concern:*

Be it known that I, WILLIAM W. HENDERSON, a citizen of the United States, residing at Washington, in the District of Columbia, have invented certain new and useful Improvements in Reversing-Gearing, of which the following is a specification.

This invention relates to gearing particularly adapted and intended for automobile use, but capable of uses in other relations, if desired.

The object of the invention is to provide an improved reverse gearing, operating in connection with a driving shaft and the differential gearing between the axle sections of the car.

By means to be hereinafter described, the machine may be reversed without the use of the ordinary reversing gear associated with the transmission shaft, the reverse being effected by shifting a casing which incloses the planetary gearing, said casing being provided with right and left gears which respectively mesh with pinions on the driving shaft for the purpose of driving the axle sections in either direction.

I am aware that attempts have heretofore been made to accomplish the same result by shifting the driving shaft in its bearings or supports, from one gear to another, but this is objectionable for various reasons which need not be discussed here, a principal one being the instability of the supports for the driving shaft in consequence of the side thrust. My invention avoids any such defects by shifting the differential casing, the shifting means being so constructed as to produce a solid support which will effectively resist strain tending to separate the gears.

The invention is illustrated in the accompanying drawings in which—

Figure 1 is a plan view of the gearing, the upper half of the gear casing being partly broken away; Fig. 2 is a sectional view. Fig. 3 is a sectional detail on line 3—3 of Fig. 2.

Referring specifically to the drawings, 6 indicates the axle casings, 7 the axle sections, and 8 the outer casing rigid with the axle casings. The driving or transmission shaft is indicated at 9, with its axis at a right angle to the axle, and it is supported in bearings 10 in a neck forming a part of the gear casing. The shaft has thereon the driving pinion 11.

The planetary gears of the differential gearing are indicated at 12, and require no particular description, since the differential gearing may be of any approved type, said planetary gears meshing with gears 13 on the ends of the axle sections in a known manner, and being mounted in a casing 14 which has sleeves 15 fitting over the inner ends of the axle sections, a tubular bushing 16 being inserted to take the wear. This differential casing may turn in bearings 17 the outer members of which are fixed to the outer casing 8, as by bolts 18.

Inclosing the casing 14 of the differential gearing is a box 19, which is non-rotatably connected to the differential casing by means of one or more keys 20 which slide in grooves in the periphery of the differential casing, so that when the outer box is turned the differential gearing is also turned. The box 19 is provided at its opposite ends with the right and left gears 21, properly located to respectively mesh with the driving pinion 11; and the box 19 may be slid axially to engage either of said gears with said pinion. At each end of the box are roller bearings 22 located between said box and the inner member 23 of a shifting device, the other member of which is indicated at 24. The member 24 is fixed to the outer casing in any suitable manner, as by pins 25 projecting from the supports of the bearings 17, so that said member 24 cannot turn. The member 23 is capable of a turning movement upon a wearing sleeve 26 surrounding the sleeve 15 of the differential casing. Each member 23 and 24 consists of a ring having complementary segmental projections on their adjacent or meeting faces, which projections interlock when the rings are closed together and which are disengaged when the rings are separated, and one face of each projection is beveled or inclined, as indicated at 27, so that when the rings are forcibly turned with respect to each other said inclined surfaces act as cams to force the rings apart and disengage said projections. As stated, each ring 23 may be turned to a limited extent, and when turned in one direction it operates as a cam to disengage its projections from those of its associated ring 24 and to engage the projections of the pair of rings on the opposite side of the box 19; and the height of the projections is such that when one pair of rings is completely disengaged the other pair is fully engaged, and, furthermore, when the disengaged ring is fully turned the outer ends or surfaces 28 of its projections will move to a position directly opposite the outer ends of the corresponding projections on its associated ring or member; that is, the two surfaces 28 will contact or abut against each other, forming pratically a solid block to stand the endwise thrust on the bearings 22 incident to engagement of the pinion 11 with the gear 21. In other words, the solid support so formed will effectively prevent disengagement of the gear 21 and the pinion 11.

It will be understood that when one ring 23 of one pair of shifting members is moved so that its projections fall into the recesses between the projections of the ring 24 of that pair, the rings 23 and 24 of the opposite pair of shifting members are in such position that the sides or surfaces 28 are in contact, and the gear 21 on that side of the gear box will accordingly be engaged with the pinion 11, and vice-versa. A neutral position is possible with both gears 21 out of mesh with pinion 11, by so turning the movable shifting rings 23 that the projections thereon extend part way into the notches of the corresponding rings 24. This is the normal condition, and to produce the same, coil springs 30 are located in a central recess between the members 23 and 24, tending to separate said members, and the springs between each pair of said members being balanced, will normally tend to separate each pair half-way, thereby shifting the gear box 19 to middle position and disengaging its gears from the driving pinion 11.

The movable shifting rings 23 may be turned by any appropriate means. I have illustrated a rod 31 pivotally connected at 32 to each ring and working in an opening 33 in the housing 8, and connected to a lever 34. By this means each ring may be individually turned. Obviously various other arrangements may be made for turning the rings.

In operation, assuming the parts to be in neutral position with the projections on both pairs of rings partly engaged, one of the rings 23 is turned in a direction to bring its cam surfaces 27 against the cam surfaces of its coöperating ring 24. The cam surfaces thus ride up each other, thereby sliding the box 19 along and causing its appropriate gear 21 to engage the driving pinion 11, and continued turn of the ring brings the ends or surfaces 28 in opposition, thereby locking the gears together, so to speak, and supporting the same against the lateral thrust; and by the same movement the projections on the opposite pair of rings are forced between each other. The whole box 19 is then free to turn, and in consequence of the keys 20 the differential gear casing 14 turns therewith and the axle sections will be driven in one direction, the compensating movement being permitted by the ordinary differential gearing. To reverse the direction of drive the ring 23 which was shifted, as above stated, is first turned back to bring its projections opposite the spaces between the projections of its associated ring 24. Then, the ring 23 on the opposite side is turned in a direction to cause its inclined surfaces 27 to ride up the corresponding inclined surfaces of its associated ring 24, which thereby shifts or forces the gear box 19 along until the opposite gear 21 is engaged in the same manner, thereby reversing the direction of the drive. The roller bearing 22 between the gearing box and the shifting rings permits said box to turn freely to effect the drive, and the levers 34 will merely have to be locked or held with sufficient force to overcome any slight turning tendency incident to the friction of the roller bearing. Obviously an ordinary notched segment or similar device will be sufficient for this purpose. The thrust or strain tending to disengage the pinion 11 and the gear 21 will thus exist at one side only, and will be transmitted through the bearings 22 on that side, to the ring 23, the contacting surfaces 28 and the ring 24, to the solid support afforded by the casting which supports the bearings 17 and forms a part of the housing 8.

The invention thus provides a combined differential and reversing gearing which may be all supported and inclosed in a single housing on the rear axle casing, thereby avoiding the necessity for the usual reverse gearing in the transmission and permitting the use of a change speed gearing and clutch, such for example as that disclosed in my U. S. Patent No. 879,045 or my U. S. Patent No. 954,286.

I claim:

1. The combination of axle sections, connecting driving mechanism between the same including differential gearing and opposite gears shiftable with respect to said sections and gearing, a driving device between said gears and engageable with either, and turning cam rings extending around the axle, and located on opposite sides of said mechanism and bearing against the same and arranged to shift said gears to engage either with said driving device.

2. The combination of axle sections, a driving shaft extending at an angle thereto and a pinion thereon, connecting driving mechanism between the pinion and axle sections, including differential gearing and a pair of opposite shiftable gears rigidly connected together and non-rotatably mounted on said gearing either of which gears may be engaged with the pinion, and means to shift said gears for said purpose.

3. The combination of axle sections, a differential gearing and its casing between the same, a shifting box non-rotatably mounted on said casing and opposite gears thereon, cam rings extending around the axle sections, on opposite sides of the box, and adapted to be turned to move the box axially in either direction, bearings between said rings and box, a driving pinion between said gears and engageable with either, and means to turn the rings to shift the box and engage either gear with the pinion.

4. The combination of a housing, axle sections therein, a differential gearing and its casing between the sections, a box rotating with said casing and shiftable axially thereon, opposite wheels fixed on said box, a pair of shifting members supported in the housing on each side of the box and adapted to shift the same axially, each pair comprising a fixed member and a movable member with contacting cam surfaces acting to spread said members and shift the box when the movable member is appropriately operated, and a driving pinion located between said wheels and engageable with either when the box is shifted accordingly.

5. The combination of a housing, axle sections therein, a differential gearing and its casing between the sections, a box rotating with said casing and shiftable axially thereon, opposite gears on said box, means to exert pressure between the housing and opposite sides of the box, to shift the latter in either direction, and a driving pinion located between said gears and engageable with either.

6. The combination of a driven shaft or axle, a driving shaft arranged at an angle thereto and a pinion thereon, a gear operatively connected to the driven shaft and shiftable axially thereon into and out of engagement with the pinion, and means to shift said gear comprising a pair of rings extending around the driven shaft and supporting the gear, said rings having corresponding inclined projections with blunt ends, one of said rings being adapted to be turned to cause said inclined projections to ride up each other to shift the gear to engagement with the pinion, and with said blunt ends in contact with each other to support the thrust on the gear.

7. The combination of a housing, axle sections projecting into the same, a driven shaft extending into the same at an angle to said axle and a driving pinion thereon, a differential gearing and its casing between the axle sections, a box shiftable axially on the casing and connected thereto to rotate the same when the box is rotated, opposite gears carried by said box and located on opposite sides of the pinion, either of which gears is engageable with the pinion, springs tending to shift the box to neutral position with both of said gears out of engagement with the pinion, and means to shift the box in either direction to engage either gear with the pinion.

8. The combination of a housing, axle sections projecting into the same, a driven shaft extending into the same, at an angle to said axle and a driving pinion thereon, a differential gearing and its casing between the axle sections, a box shiftable axially on the casing and connected thereto to rotate the same when the box is rotated, opposite gears carried by said box and located on opposite sides of the pinion, either of which gears is engageable with the pinion, springs tending to shift the box to neutral position with both of said gears out of engagement with the pinion, and means to shift the box in either direction to engage either gear with the pinion, said means comprising cam devices located respectively between the housing and opposite sides of the box, and means to operate said devices to shift the box either way.

In testimony whereof, I affix my signature in presence of two witnesses.

WILLIAM W. HENDERSON.

Witnesses:
C. W. FOWLER,
GEO. E. TEW.